(12) United States Patent
Bowyer et al.

(10) Patent No.: US 8,928,164 B2
(45) Date of Patent: Jan. 6, 2015

(54) METHOD AND APPARATUS FOR PROTECTING WIND TURBINES FROM FATIGUE DAMAGE

(75) Inventors: Robert Bowyer, London (GB);
Christopher Spruce, Leatherhead (GB);
Justin Creaby, Broomfield, CO (US)

(73) Assignee: Vestas Wind Systems A/S, Aarhus N. (DK)

( * ) Notice: Subject to any disclaimer, the term of this patent is extended or adjusted under 35 U.S.C. 154(b) by 245 days.

(21) Appl. No.: 13/518,776

(22) PCT Filed: Dec. 22, 2010

(86) PCT No.: PCT/EP2010/070553
§ 371 (c)(1),
(2), (4) Date: Nov. 26, 2012

(87) PCT Pub. No.: WO2011/076875
PCT Pub. Date: Jun. 30, 2011

(65) Prior Publication Data
US 2013/0062880 A1  Mar. 14, 2013

Related U.S. Application Data

(60) Provisional application No. 61/289,865, filed on Dec. 23, 2009.

(30) Foreign Application Priority Data

Dec. 23, 2009  (GB) .................................. 0922592.1

(51) Int. Cl.
*F03D 9/00* (2006.01)
*H02P 9/04* (2006.01)
*F03D 7/04* (2006.01)
*F03D 7/02* (2006.01)

(52) U.S. Cl.
CPC ........... *F03D 7/0292* (2013.01); *F05B 2270/32* (2013.01); *F05B 2270/322* (2013.01);
(Continued)

(58) Field of Classification Search
CPC ... H02P 9/04; H02P 2009/004; Y02E 10/723; Y02E 10/72; Y02E 10/74; Y02E 10/728; F03D 9/003; F03D 9/002; F03D 7/0276; F03D 7/042; F03D 7/0292; F05B 2260/82; F05B 2270/321; F05B 2270/332; F05B 2270/32
USPC ......................................... 290/44, 43, 55, 54
See application file for complete search history.

(56) References Cited

U.S. PATENT DOCUMENTS 5,289,041 A  2/1994  Holley
6,320,272 B1  11/2001  Lading et al.
(Continued)

FOREIGN PATENT DOCUMENTS

EP  1770278  4/2007
EP  1911968  4/2008
(Continued)

OTHER PUBLICATIONS

International Search Report dated Oct. 20, 2011 for PCT/EP2010/070553.
(Continued)

*Primary Examiner* — Javaid Nasri
(74) *Attorney, Agent, or Firm* — Patterson & Sheridan, LLP

(57) ABSTRACT

A wind turbine has a Lidar device to sense wind conditions upstream of the wind turbine including wind speed, direction and turbulence. Signals from the Lidar are processed to detect an event which could give rise to low cycle fatigue loading on one or more components of the wind turbine. On detection the system controller takes the necessary evasive action depending on the nature and severity of the extreme condition detected. This may include a significant reduction in power generated through reduction in rotor speed or torque, complete shutdown of the generator and yawing of the nacelle and rotor in response to a change in wind direction.

26 Claims, 4 Drawing Sheets

(52) U.S. Cl.
CPC ....... *F05B 2270/805* (2013.01); *F05B 2260/82* (2013.01); *F03D 7/042* (2013.01); *F05B 2270/332* (2013.01); *F03D 7/0276* (2013.01); *F05B 2270/321* (2013.01); *Y02E 10/723* (2013.01)
USPC .......................................................... 290/44

(56) References Cited

U.S. PATENT DOCUMENTS

| | | | | |
|---|---|---|---|---|
| 7,281,891 | B2* | 10/2007 | Smith et al. .................... | 415/4.3 |
| 7,342,323 | B2* | 3/2008 | Avagliano et al. .............. | 290/55 |
| 2003/0160457 | A1 | 8/2003 | Ragwitz et al. | |
| 2006/0140764 | A1 | 6/2006 | Smith et al. | |
| 2007/0067067 | A1 | 3/2007 | Stommel | |
| 2009/0224542 | A1 | 9/2009 | Nim | |

FOREIGN PATENT DOCUMENTS

| | | |
|---|---|---|
| EP | 2025929 | 2/2009 |
| EP | 2110551 | 10/2009 |
| JP | 2006125265 | 5/2006 |
| JP | 2008064081 | 3/2008 |
| WO | 2004077068 | 9/2004 |
| WO | 2007045940 | 4/2007 |
| WO | 2011076295 | 6/2011 |
| WO | 2011076818 | 6/2011 |

OTHER PUBLICATIONS

A. Kusiak et al., Anticipatory Control of Wind turbines With Data-Driven Predictive Models, IEEE Transactions on Energy Conversion, vol. 24, Issue 3, pp. 766-774, Sep. 1, 2009, IEEE, Piscataway, NJ, US.

International Search Report dated Oct. 20, 2011 for PCT/EP2010/003296.

International Search Report dated Oct. 20, 2011 for PCT/EP2010/070443.

* cited by examiner

METHOD AND APPARATUS FOR PROTECTING WIND TURBINES FROM FATIGUE DAMAGE

FIELD OF THE INVENTION

This invention relates to wind turbines and more specifically to the protection of wind turbines from damage caused by low cycle fatigue.

BACKGROUND TO THE INVENTION

When selecting a wind turbine for a given operating location, consideration is given to characteristics of the site such as the complexities of the site terrain and the average wind conditions. The turbines chosen can ideally operate at rated power for as much of the time as possible. However, in practice, wind speeds are variable and the turbine must be able to cope with a wide variety of wind speeds. At lower wind speeds the power output will either be zero, if there is negligible wind, or below rated power. Once the wind speed increases to above that required for generation of rated power, the turbine will protect itself from damage, for example, by varying the pitch of the blade to reduce the power extracted from the wind. In extreme cases the turbine may shut down or yaw out of the wind to prevent catastrophic damage.

International Standard IEC 64100-1, $3^{rd}$ Edition, defines normal and extreme wind conditions which a wind turbine must be designed to withstand. These requirements place limitations on the design of wind turbine components as all components must be able to withstand the most extreme conditions.

We have appreciated that there are certain wind conditions which, although are not recognised as extreme under the IEC 64100-1 definition, are nevertheless potentially damaging. Extreme conditions tend to cause serious damage through a single event, such as an extreme gust or change of direction with high wind speed. However, we have appreciated that there is a class of events which cause loading on the turbine components of a magnitude which is lower than the design load, but high enough that only a small number of such loads or load cycles is needed to cause failure of a component. These loadings, referred to as low cycle fatigue loads, may require fewer than 100 instances of loading or loading cycles for failure to occur. As wind turbines are designed for a lifetime of twenty years, this type of event need only occur a handful of times a year for failure to take place during the lifetime of the wind turbine. In the past it has not been possible to assess the rate of accumulation of low cycle fatigue in wind turbine components.

An example of a condition which causes a low cycle fatigue is a combination of high wind speed, high turbulence and a high standard deviation of wind direction. We have further appreciated that a reduction in exposure to events causing low cycle fatigue will remove some of the design constraints on wind turbine components. Not only will this preserve and extend the lifetime of the components but it will also enable blades to be made using less material, and therefore more cheaply. Alternatively larger blades may be used at a given site enabling greater energy extraction from the wind.

SUMMARY OF THE INVENTION

According to the invention there is provided a control system for a wind turbine, comprising a device mounted on the wind turbine to sense at least wind speed and direction at a position upwind of the wind turbine, a detector for receiving and processing signals from the sensing device to detect wind conditions at the position upwind of the wind turbine which would expose one or more components of the wind turbine to low cycle fatigue loading, and a controller for generating one or more control signals for varying an operating setpoint of the wind turbine to a value outside a normal operating value in response to detection of the low cycle fatigue loading wind condition.

The invention also provides a method of controlling a wind turbine, comprising sensing at least wind speed and direction at a position upwind of the wind turbine using a sensing device mounted on the wind turbine, receiving and processing signals from the sensing device at a detector to detect wind conditions at the position upwind of the wind turbine which would expose one or more components of the wind turbine to low cycle fatigue loading, and generating one or more control signals at a controller for varying an operating setpoint of the wind turbine to a value outside a normal operating value in response to detection of the low cycle fatigue loading wind condition.

Embodiments of the invention enable a wind turbine to detect wind conditions that may lead to a low cycle fatigue event sufficiently in advance that evasive action can be taken before the conditions arrive at the wind turbine. This enables the potentially catastrophic effects of the conditions to be mitigated by altering the operating parameters of the wind turbine. The turbine may be returned to its normal operating conditions once the sensed signals show that the event has ended.

A normal operating value for a setpoint may be one that is within a predetermined range of production values under which the wind turbine produces energy.

As embodiments of the invention have the advantage of mitigating the effects of low cycle fatigue loading wind conditions, wind turbine components such as blades do not have to be designed to withstand the same level of loading. As a result, blades and other components may be made lighter, with less material, so reducing manufacturing costs. Alternatively, for a given installation, larger blades may be used, enabling more energy to be extracted from the wind.

Preferably, the detector detects also detects turbulence. The evasive action taken in response to detection will depend on which, or which combination of conditions is detected, and the severity of those conditions.

Preferably, the sensing device senses wind conditions at positions between 0.5 and 3 rotor diameters in front of or upwind of the wind turbine and preferable at a plurality of positions. It is also preferred that the data gathered by the sensing device is corrected to take account of axial induction. This is facilitated by the use of a multiple range gate sensing device which senses conditions at a plurality of positions.

The sensing device may be mounted on the nacelle of the turbine, on the tower, on the hub or in individual blades. A single blade mounted device may be used or multiple devices may be used in a blade. One or more devices may be used in more than one blade.

Preferably, a data corrector processes the output from the sensing device to correct the output to take account of wind coherency. Both correction for axial induction and wind coherency have the advantage that the detection of extreme events is more precise avoiding unnecessary evasive action which results in a loss of power generation and so should only be undertaken when absolutely necessary.

The control signals generated by the controller in response to detection of an extreme event may comprise a yaw signal and/or a power signal. The power signal may comprise a generator shutdown command, a rotor speed command, a generator power output command and/or a torque command.

Preferably, the value of the one or more control signals is determined with reference to the existing values of the parameters to be controlled.

Preferably the sensing device is a Doppler anemometer, such as a Laser Doppler anemometer. A Lidar is one example of a preferred sensing device.

The invention also resides in a wind turbine having a control system as defined above.

DESCRIPTION OF THE DRAWINGS

Embodiments of the invention will now be described, by way of example only, and with reference to the accompanying drawings, in which.

DETAILED DESCRIPTION OF THE INVENTION

Figure 1:
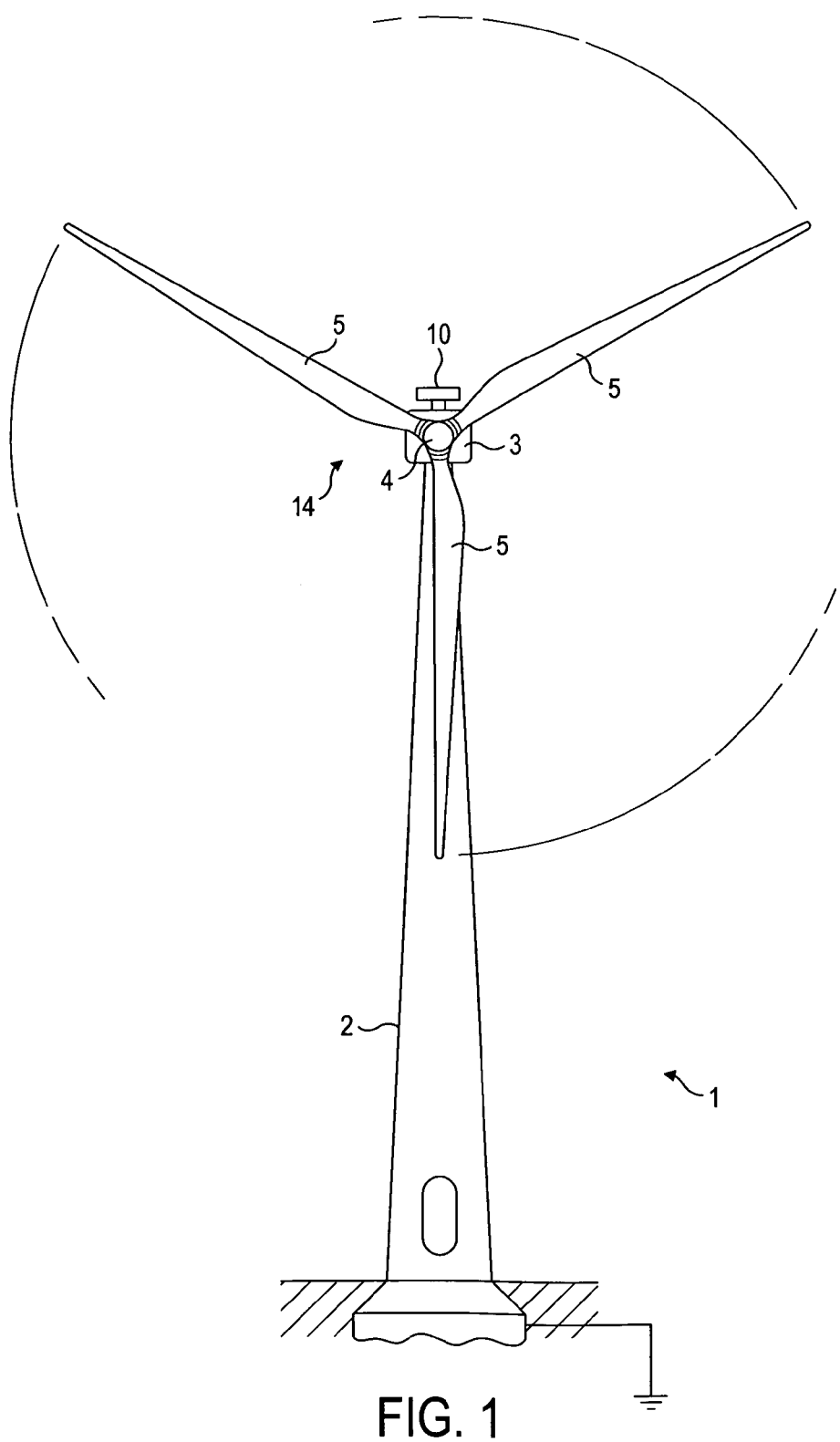
FIG. 1 is an end view of a wind turbine embodying the invention.
Figure 2:
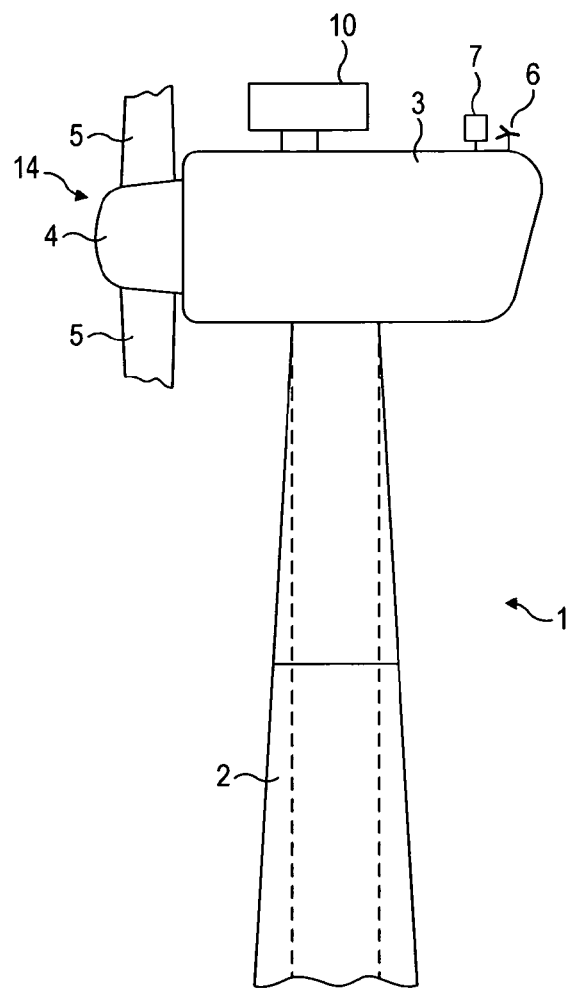
FIG. 2 is a side view of the wind turbine of FIG. 1 with the blades only partially shown.

FIGS. 1 and 2 illustrate a wind turbine embodying the invention which comprises a tower 2, a nacelle which houses a generator (not show) and a rotor 14 carrying three rotor blades 5. Part of the tower 2 and part of the blades 5 are omitted in FIG. 2 for the sake of clarity. A spinner 4 is mounted on the rotor hub 15 and a cup anemometer 6 and an ultrasonic wind sensor 7 are arranged on the upper surface of the nacelle 3. The invention is not limited to three bladed turbines although most commercial wind turbines use a three bladed rotor.

A sensing device 10 is also mounted on the wind turbine. The sensing device is forward looking and senses at least wind speed and wind direction at a position upwind of the wind turbine. A preferred device is a Doppler anemometer. This device is preferably a Laser Doppler Anemometer such as a Lidar although other types of Doppler anemometer such as a SODAR or RADAR may be used. In the following description a Lidar is used as the preferred device. In some more simple embodiments an anemometer device that does not use the Doppler effect may be used. A Lidar apparatus 10 is also mounted on the wind turbine. The Lidar is shown in FIGS. 1 and 2 as being mounted on the upper surface of the nacelle, but its position may vary. For example, it may be mounted on the tower, on the underside of the nacelle, in the spinner or even in the blades. In the latter case, a separate Lidar may be mounted in each blade or a single Lidar in one or two only of the blades. An individual blade may have more than one Lidar.

The use of Lidar to control operation of a wind turbine under normal operating conditions is known, for example, from U.S. Pat. No. 6,320,272 of Lading et al. This document teaches the use of a laser wind velocity measurement system such as Lidar (Light Detection and Ranging) mounted on the nacelle. Lidar operates by emitting a laser beam in front of the wind turbine to measure conditions a distance in front of the wind turbine. The Lidar operates in a known manner either by detecting air molecules or by detecting particles in the air stream and calculating information about the airflow from these measurements. This information may include wind speed direction and wind shear in the vertical and horizontal directions although the parameters that can be calculated will depend on the complexity of the Lidar used. In the known uses of Lidar, the operational parameters of a wind turbine may be controlled to optimise the amount of energy that can be extracted from the wind.

In embodiments of the present invention, Lidar is used in conjunction with the system controller to detect incoming wind conditions which could give rise to a low cycle fatigue event. The event is detected sufficiently in advance that the turbine can be configured before the detected event arrives at the wind turbine to avoid low cycle fatigue loading when the event arrives.

The complexity of the Lidar reflects the need to measure or calculate wind speed, turbulence and wind direction. Examples of suitable Lidar include multiple beam Lidar including Lidar that uses multiple lenses to generate multiple beams from a single laser unit and scanning head Lidar which generate a single or multiple beams each of which scan an area of the advancing wind front. Scanning may also be achieved by mounting a single beam Lidar in the hub or spinner of the rotor with the beam angled away from the axis of rotation of the hub. As the rotor rotates, so the beam will scan an area of the advancing wind front.

In a first embodiment of the invention, the data provided by the Lidar is used to detect wind conditions that will lead to a low cycle fatigue load. On detection, the wind turbine controller commences a shut down routine in advance of the wind event reaching the rotor. Where the Lidar is sensing conditions one rotor diameter in front of, or upstream of the rotor, for a 20 m/s average wind speed, shut down would be commenced five seconds before the event reaches the wind turbine for a 100 m rotor diameter. The turbine restarts once the event has passed or, in the case of a change of wind direction, the turbine has corrected its positioning relative to the wind direction using its yaw drive. Thus low cycle fatigue loading is avoided by taking action to reduce the loading on the turbine components when the wind event arrives. The sensing device measures conditions preferably at between 0.5 and 3 rotor diameters in front of, or upwind, of the wind turbine.

In a second embodiment of the invention, the incidence of low cycle fatigue loading is reduced by reducing one or both of rotor rotational speed and torque in advance of the wind event reaching the rotor. Torque is reduced by reducing the generator current demand. As in the first embodiment, normal operation is recommenced once the event has passed or the turbine has corrected its positioning relative to the wind direction.

In each of these embodiments, the nacelle may also be yawed into the wind to reduce asymmetric loading on the turbine.

Thus, embodiments of the invention enable the wind turbine to detect the onset of an event that could cause low cycle fatigue loading on components of the wind turbine and to take evasive action to ensure that the loading event does not occur or that the loading is reduced to an extant that it does not contribute significantly to the fatigue lifetime of the components. As well as improving the lifetime of wind turbine components, these embodiments have the advantage that components, for example blades, do not have to be designed to withstand the loads associated with low cycle fatigue events. This enables the components to be made either with less material, making them lighter and cheaper to produce. Alternatively, they may be designed to handle greater loading under normal operating conditions. In the case of the turbine blades, this equates to longer blades enabling greater energy capture.

In practice, the turbine controller will decide which control regime to apply depending on the measurements and calculations of wind speed, turbulence and direction made by the Lidar. Control settings for a wide range of possible measurements may be stored, for example in a look up table at the controller.

It is preferred that the Lidar does not only measure conditions at a single point upstream of the turbine, but at multiple points. Such a multiple gate range Lidar is known in the art. Multiple distance measurements are desirable as the wind front approaching the wind turbine will vary and develop. It also enables the system to correct data measurements to take into account axial induction and wind coherency errors which, if uncorrected, can lead to the wind turbine taking evasive action where none is needed due to an over estimation of the severity of conditions when they reach the wind turbine. Unnecessary corrections are undesirable as they reduce the power generated by the wind turbine and so result in financial loss to the operator.

Axial induction occurs in front of the rotor and is caused by a pressure build up in front of the rotor due to the physical presence of the rotor. This tends to slow the airflow through the rotor and spreads the airflow radially outwards. Thus, an accurate measurement of wind speed upstream of the rotor will give a value that is greater than the wind speed when that wind front reaches the rotor.

Wind coherency correction is required as the turbulent nature of the wind causes the airflow to change as it moves from point to point. A gust detected at a distant range gate may change dramatically by the time the gust reaches the wind turbine. Coherency corrections may be based on data modules built up from multiple range gate measurements and may be specific to a given wind turbine as local conditions such as terrain may affect local coherency.

Figure 3:
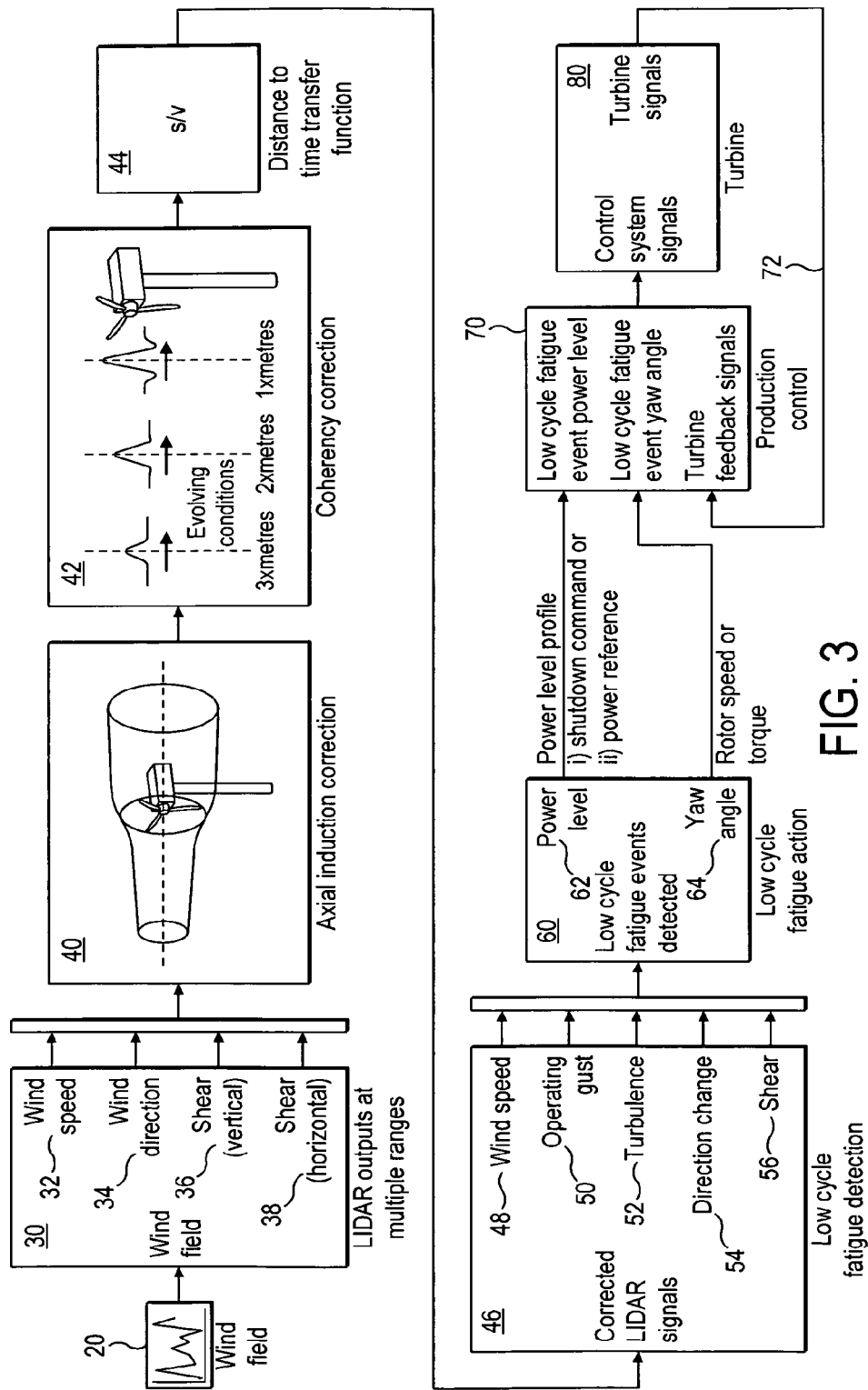
FIG. 3 is a schematic view of a controller for the wind turbine of FIGS. 1 and 2 and embodying the invention.

FIG. 3 shows a controller embodying the invention and which corrects for axial induction and wind coherence.

The wind field is illustrated at 20 and is detected by Lidar 30 which outputs multiple range measurements of wind speed 32, wind direction 34, vertical shear 36 and horizontal shear 38. These measurements enable calculation of wind turbulence and standard deviations of wind direction which, together with wind speed measurements, are used to determine in advance the existence of an event which, when it arrives at the wind turbine, may give rise to a low cycle fatigue load on a wind turbine component.

The measured values are corrected by the controller first for axial induction at 40 and then for coherency at 42 although the order of correction is not important. The corrected measurements are then converted into a time signal at 44 by applying a distance to time transfer function to provide corrected Lidar signals which provide an input to a low cycle fatigue detection unit 46. This unit processes the Lidar signals and, if an event is detected which would result in low cycle fatigue loading, the unit can output a low cycle fatigue load trigger event. The low frequency fatigue load detection unit can detect wind speed, gust strength, turbulence, direction change and shear and output a trigger signal for each on a respective output as shown in FIG. 3. The output triggers form inputs into a low cycle fatigue load action unit 60 which commands the wind turbine to take appropriate evasive action depending on the trigger input. As described above, the evasive action may be generator shut down or a reduction in rotational speed or torque. Any of these may be accompanied by a yaw command to yaw the nacelle where a change in wind direction has been detected. The yaw drive will move the wind turbine into the wind such that the loading on the turbine is evenly distributed across the rotor in the horizontal direction. As the control signal has been developed in response to the advance detection of the potential low cycle fatigue load, there is sufficient time for the yaw drive to move the rotor before the detected event arrives at the turbine.

The low cycle fatigue action unit 60 outputs one or both of a yaw angle command 64 or a power level demand 62. The demand signals are input as low cycle fatigue event power level and low cycle fatigue event yaw angles signals to a production control unit 70 which also receives as an input turbine, feedback signals 72 from the wind turbine and generates as outputs control system signals which are applied to the wind turbine 80 to control wind turbine parameters. The power level control signal developed by the low cycle fatigue action unit 60 will cause the generator power level to be changed from its normal operating set point to a level below normal operating conditions. The power level demand signal sent will depend on the nature and severity of the event detected and it may include a generator shut down command in response to which the controller performs an emergency shut down. This may involve opening the generator contacts and preventing generation of power so disconnecting the generator from the network to which it is attached.

The yaw angle signal developed by the low cycle fatigue event action unit 60, when applied as a control signal by the production control unit causes the wind turbine yaw drive to move the rotor out of the wind. The control signal has been developed in response to the advance detection of a low cycle fatigue event and there is sufficient time for the yaw drive of the wind turbine to move the rotor out of the path of the oncoming wind before it arrives at the turbine so that the loading on the rotor caused by the low cycle fatigue event is minimised and the fatigue damage is minimised.

The power level control signal developed by the low cycle fatigue event action unit 60 will cause the generator power level to be changed from its normal operating set point to a level below normal operating conditions. The power level demand signal sent will depend on the nature and severity of the low cycle fatigue event and may include a generator shut down command in response to which the controller performs an emergency shut down. This may involve opening the generator contacts and preventing generation of power so disconnecting the generator from the network to which it is attached.

Alternatively, the power level profile sent to the production control unit 70 may comprise a rotor speed reference that provides a new set point for the rotational speed of the rotor so that the load on the blades is reduced when the event reaches the wind turbine. Alternatively or additionally, a torque command may provide a fresh generator current command set point to reduce the torque.

Although it is essential to shut down the generator in some events, it is preferred to take less drastic action, by reducing rotational speed and/or torque if possible, as that action may be reversed more quickly when signals received from the Lidar indicate that the event has passed and that normal operating set points may be resumed.

Figure 4A:
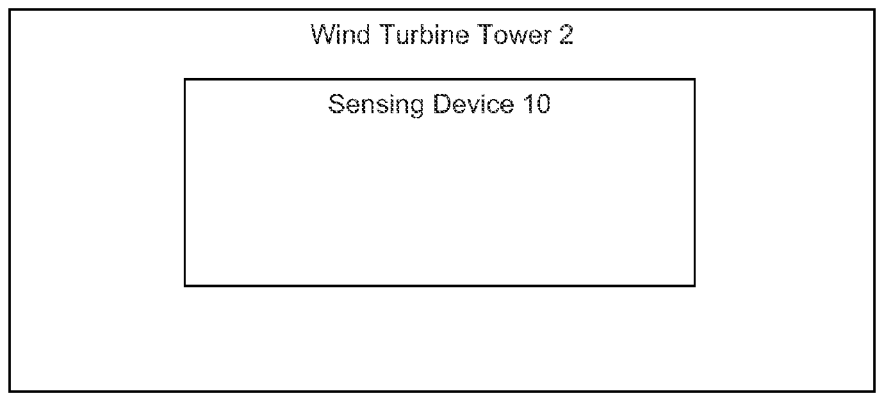
FIGS. 4A-C are block diagrams illustrating the mounting of a sensing device on various wind turbine components.
Figure 4B:
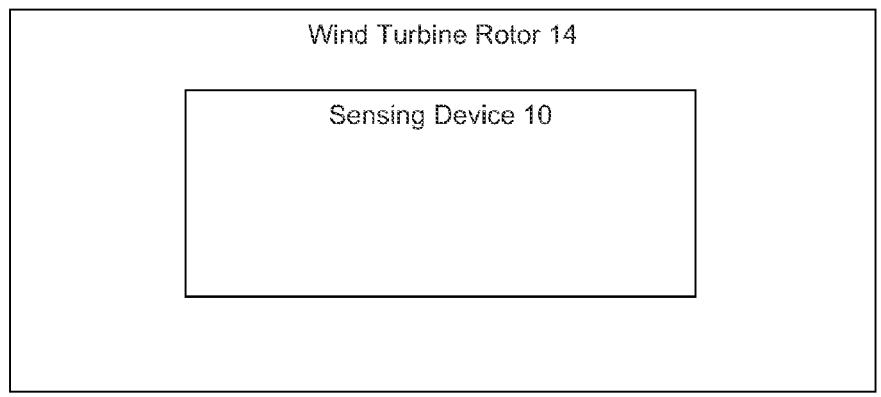
Figure 4C:
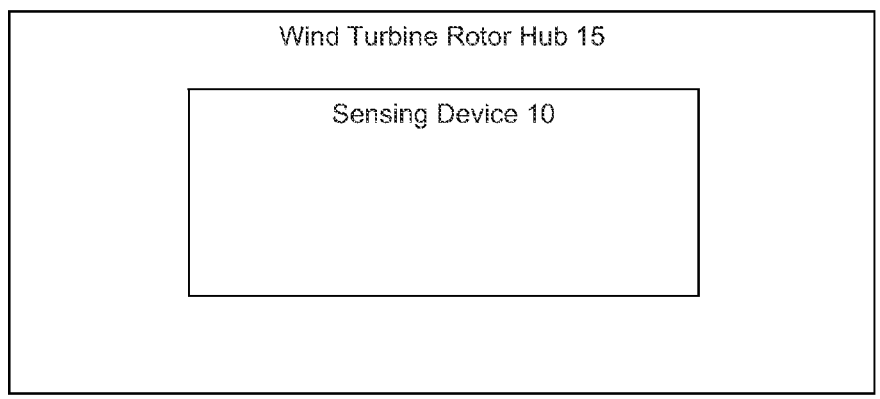

FIGS. 4A-C illustrate various embodiments of the invention in which the sensing device 10 may be positioned on the tower 2, the blade of the rotor 14, or the rotor hub 15.

Embodiments of the invention have the advantage that low cycle fatigue events may be avoided or minimised by advance detection of the wind event that might give rise to the low frequency fatigue load followed by evasive action which is taken before the event arrives at the wind turbine. As a result, the wind turbine components do not need to be designed to withstand the low cycle fatigue loads and may therefore be made using less material and, in the case of blades, longer.

Various modifications of the embodiments described are possible and will occur to those skilled in the art without departing from the invention which is defined by the following claims.

The invention claimed is:

1. A control system for a wind turbine, comprising:
a sensing device mounted on the wind turbine to sense at least wind speed and direction at a position upwind of the wind turbine;
a detector for receiving and processing signals from the sensing device to detect wind conditions at the position upwind of the wind turbine which would expose one or more components of the wind turbine to a low cycle fatigue loading wind condition, wherein the low cycle fatigue loading comprises a loading that is less than a maximum load value the one or more components are designed to tolerate but is predicted to cause the one or more components to fail if experienced over a predetermined number of loading cycles; and
a controller for generating one or more control signals for varying an operating setpoint of the wind turbine to a value outside a predetermined range of production operating values in response to detection of the low cycle fatigue loading wind condition.

2. The control system according to claim 1, wherein the detector detects a wind turbulence from the signals provided from the sensing device.

3. The control system according to claim 1, wherein the sensing device senses at least wind speed and wind direction at a plurality of positions upwind of the wind turbine.

4. The control system according to claim 1, wherein the sensing device is mounted on a wind turbine nacelle.

5. The control system according to claim 1, wherein the sensing device is mounted on a wind turbine tower.

6. The control system according to claim 1, wherein the sensing device is mounted on a blade of a wind turbine rotor.

7. The control system according to claim 1, wherein the sensing device is mounted on a wind turbine rotor hub.

8. The control system according to claim 1, wherein the sensing device measures wind conditions at a position between 0.5 and 3 rotor diameters upwind of the wind turbine.

9. The control system according to claim 1, comprising a corrector for processing an output from the sensing device and correcting the output to take account of axial induction, wherein the axial induction occurs upwind of the wind turbine rotor, and the sensing device senses wind conditions at a plurality of positions.

10. The control system according to claim 1, comprising a corrector for processing an output from the sensing device and correcting the output to take account of wind coherency, wherein the sensing device senses turbulent wind conditions and executes a coherency correction, based on a plurality of measurements from previous sensing device outputs.

11. The control system according to claim 1, wherein the one or more control signals comprises a yaw signal.

12. The control system according to claim 1, wherein a value of the one or more control signals is determined with reference to existing values of parameters to be controlled.

13. The control system according to claim 1, wherein the one or more control signals comprises a power level signal.

14. The control system according to claim 13, wherein the power level control signal comprises a rotor speed command.

15. The control system according to claim 13, wherein the power level control signal comprises a generator power output command.

16. The control system according to claim 13, wherein the power level control signal comprises a torque command.

17. The control system according to claim 13, wherein the power level control signal comprises a generator shutdown command.

18. The control system according to claim 1, wherein the controller is arranged to restore the operating setpoints when signals received from the sensing device indicate that the low cycle fatigue loading event has passed.

19. The control system according to claim 1, wherein the sensing device is a Doppler anemometer.

20. The control system according to claim 1, wherein the sensing device is a Lidar.

21. A wind turbine, comprising:
a control system comprising
a sensing device mounted on the wind turbine to sense at least wind speed and direction at a position upwind of the wind turbine;
a detector for receiving and processing signals from the sensing device to detect wind conditions at the position upwind of the wind turbine which would expose one or more components of the wind turbine to a low cycle fatigue loading wind condition, wherein the low cycle fatigue loading comprises a loading that is less than a maximum load value the one or more components are designed to tolerate but is predicted to cause the one or more components to fail if experienced over a predetermined number of loading cycles; and
a controller for generating one or more control signals for varying an operating setpoint of the wind turbine to a value outside a predetermined range of production operating values in response to detection of the low cycle fatigue loading wind condition.

22. A method of controlling a wind turbine, comprising:
sensing at least wind speed and direction at a position upwind of the wind turbine using a sensing device mounted on the wind turbine;
receiving and processing signals from the sensing device at a detector to detect
wind conditions at the position upwind of the wind turbine which would expose one or more components of the wind turbine to a low cycle fatigue loading, wherein the low cycle fatigue loading comprises a loading that is less than a maximum load value the one or more components are designed to tolerate but is predicted to cause the one or more components to fail if experienced over a predetermined number of loading cycles; and
generating one or more control signals at a controller for varying an operating setpoint of the wind turbine to a value outside a predetermined range of production values in response to detection of the low cycle fatigue loading wind condition.

23. The method according to claim 22, further comprising detecting wind turbulence at the detector from the signals provided from the sensing device.

24. The method according to claim 22, further comprising sensing at least wind speed and wind direction at a plurality of positions upwind of the wind turbine.

25. The method according to claim 22, further comprising processing an output from the sensing device to correct the output to take account of axial induction, wherein the axial induction occurs upwind of the wind turbine rotor, and the sensing device senses wind conditions at a plurality of positions.

26. The method according to claim 22, further comprising processing an output from the sensing device to correct the output to take account of wind coherency, wherein the sensing device senses turbulent wind conditions and executes a coherency correction, based on a plurality of measurements from previous sensing device outputs.

* * * * *